United States Patent [19]
Ryden

[11] 3,709,523
[45] Jan. 9, 1973

[54] HITCH BAR STABILIZER

[75] Inventor: James W. Ryden, Phoenix, Ariz.

[73] Assignee: Advanced Management Engineering & Research Co., Phoenix, Ariz.

[22] Filed: Jan. 25, 1971

[21] Appl. No.: 109,429

[52] U.S. Cl. ................................................. 280/502
[51] Int. Cl. ................................................. B60d 1/14
[58] Field of Search ..280/500, 501, 502, 505, 491 R, 280/491 D, 491 E; 248/381, 354

[56] References Cited

UNITED STATES PATENTS

| 3,481,630 | 12/1969 | Parkhurst | 280/502 |
| 2,719,733 | 10/1955 | Riemann | 280/501 |
| 3,207,396 | 9/1965 | Mundell | 280/501 |
| 1,985,582 | 12/1934 | Schwinger | 248/343 |

*Primary Examiner*—Benjamin Hersh
*Assistant Examiner*—Robert R. Song
*Attorney*—David H. Semmes

[57] ABSTRACT

A stabilizer for hitch bar assemblies of the type supporting a ball socket for towing a trailer wherein the hitch bar assembly is mounted on a towing vehicle rear bumper by means of such as compressions clamps encircling the hitch bar and engageable with the bumper.

5 Claims, 3 Drawing Figures

PATENTED JAN 9 1973          3,709,523

INVENTOR
JAMES W. RYDEN

BY David H. Semmes
ATTORNEY

HITCH BAR STABILIZER

BACKGROUND OF THE INVENTION

In the trailer rental industry, there has developed a need for a towing vehicle hitch bar which is attachable to any type of towing vehicle bumper. Such hitch bars are required to be universally attachable to all types of bumpers in use on the road today. Such hitch bars have been devised for quick and secure attachment of the hitch bar and ball socket to a variety of automobile bumpers. One such hitch bar attachment means is disclosed, for example, in co-pending application, Ser. No. 835,487 filed June 23, 1969, entitled Compression Hitch Bar Assembly, assigned to a common assignee herewith, and to which reference is herein made for structural details.

In the prior art such as exemplified in the aforementioned application, difficulties have arisen when such hitch bar assemblies are applied to certain vehicles having bumpers of such a construction that the weight of a trailer placed on a hitch ball of a tow assembly mounted solely on the bumper of the vehicle has a tendency to twist the bumper.

The present invention provides a stabilizer for hitches mounted solely on the bumpers of vehicles which eliminates this drawback and results in a much sturdier and stronger construction with enhanced operational characteristics.

SUMMARY OF THE INVENTION

According to the present invention, a hitch bar stabilizer is provided for hitch bar assemblies of a type mounted on the bumper of a towing vehicle which eliminates a tendency of a bumper to twist with the weight of a trailer placed on a hitch ball and especially with the hitch assembly applied to a vehicle bumper lacking in twist resistant strength or characteristics. More specifically a stabilizing bar is used which slips or fits over a hitch bar and includes a plate having a plurality of holes which are staggered and additionally a hitch jaw housing is provided with mating staggered holes to allow for adjusting the stabilizing bar from whatever position the jaw assembly happens to fit to the bumper to a horizontal plane. The other end of the stabilizing bar fastens to the auto frame by either bolting to an existing hole in the frame or by clamping means. The resultant structure provides support for a vertical tongue weight. On the horizontal plane an adjustment is also provided by means of serrated teeth arrangement and permits compensating for required horizontal length adjustments.

Additional objects and advantages of the invention will become more readily apparent from the following detailed description of an embodiment thereof when taken together with the accompanying drawings in which.

Figure 1:
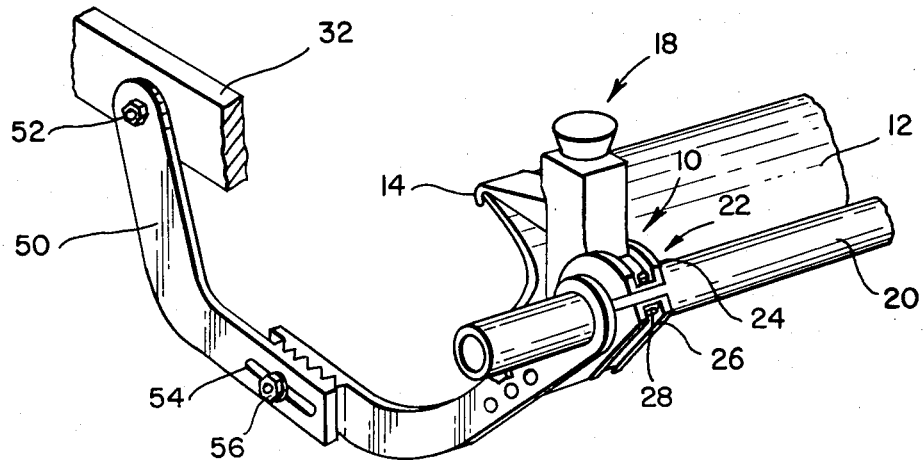
FIG. 1 is a fragmentary perspective view of the stabilizer of the present invention shown connected to a hitch bar assembly on a towing vehicle.
Figure 2:
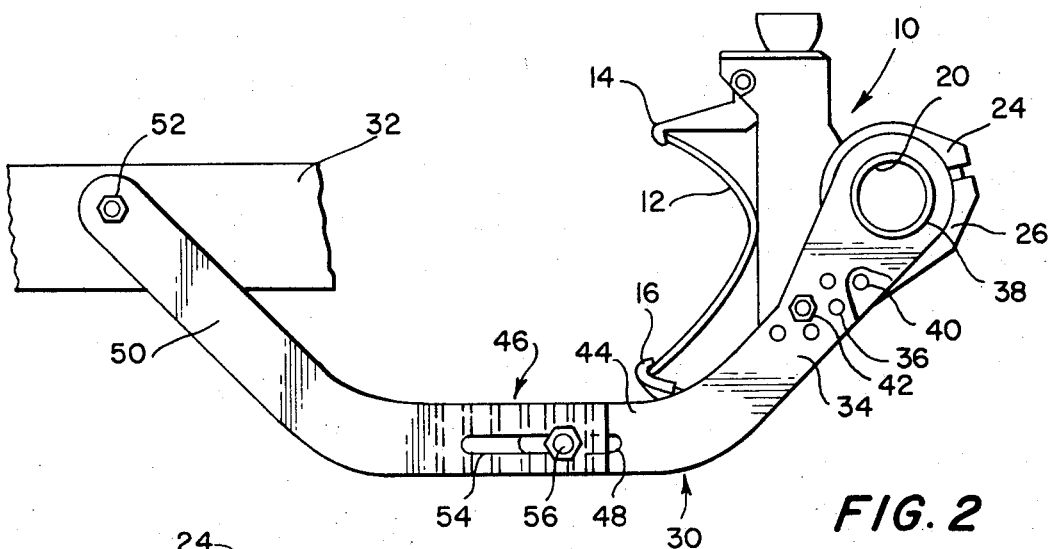
FIG. 2 is a side elevational view of the structure of FIG. 1.
Figure 3:
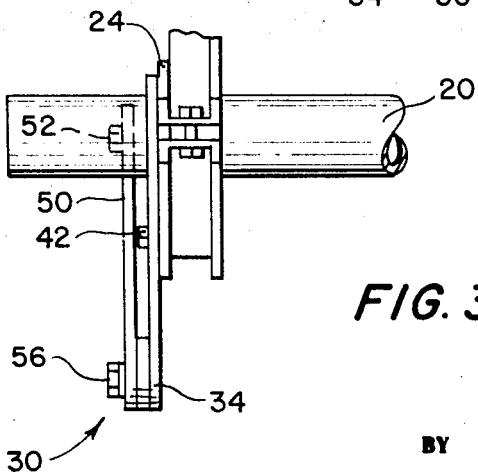
FIG. 3 is an elevation view showing in greater detail structure and application to a hitch bar.

Referring now in more detail to the drawings a hitch bar assembly generally designated 10 is shown attached to an automobile bumper 12. The hitch bar assembly is of a compression clamp type as shown in greater detail in the aforementioned pending application and includes bumper-engaging compression clamps 14 and 16 which engage over and around the bumper edges. Securement means 18 for the clamping jaws are broadly indicated. Two such bumper clamps are utilized at spaced positions on the vehicle bumper in a usual manner and mount therebetween a hitch bar 20 adapted for mounting a hitch ball. The hitch bar is mounted by means of a compression clamp housing 22 consisting of upper and lower clamping jaws 24 and 26, the upper one of which is pivotally mounted and a bolt lock 28 is operatively associated with the jaws for appropriate clamping and securement of hitch bar 20 therebetween. The hitch bar 20 has appropriately mounted a hitch ball, not shown.

Some present day bumper constructions lack strength and structure to resist or support vertical tongue weight applied for a trailer being towed and the weight of the trailer has a tendency to twist the bumper.

The present invention eliminates this twist tendency by means of a stabilizing bar assembly 30 adapted for attachment to and between the hitch bar assembly 10 and frame 32 of a towing vehicle. The construction, as will appear, eliminates the twisting tendency created on the vehicle bumper by vertical tongue weight of a trailer. The stabilizing bar assembly includes a plate 34 having a plurality of holes 36 therethrough and a hitch bar mounting opening 38 in proximity to the end, the plate being adapted to slip over the hitch bar. The hitch jaw 26 is also provided with a plurality of staggered holes 40. A bolt or bolts 42 are used for passing through mating ones of holes 36 and 40 for securement.

The forward end of plate 34 terminates in an arm 44 having a plurality of serrations generally indicated at 46 on the inner face thereof and a longitudinally extended slot 48. A second arm 50 is adapted for securement to frame 32 by means of a bolt 52 or the like passing through a hole in the arm and an existing hole or opening in the frame. In some applications the bolt can be replaced by other securement or clamping means. The rearward end of arm 50 is likewise provided with serrations or teeth on its inner face for mating engagement with serrations or teeth 46 and the free end of arm 50 is provided with elongated slot 54. A clamping or securement nut and bolt 56 interengages and secures the arms 44 and 50 after appropriate adjustment therebetween along a horizontal plane with and by virtue of the slots and coacting serrations or teeth. The two sets of staggered holes allow for adjusting plate 34 for adjusting the arm 44 of the stabilizing bar from whatever position the jaw assembly happens to fit to the bumper to a horizontal plane.

The resultant stabilizing bar assembly, including coacting mating arms 44 and 50, is generally U-shaped in assembled configuration when mounted and the construction permits for adjusting the arms of the stabilizing bar from whatever position the jaw assembly happens to fit to the bumper to a horizontal plane to facilitate horizontal length adjustment by adjusting the relative positions of arms 44 and 50 and rigid securement when so adjusted. The other end of the stabilizing bar is fastened to the auto frame. When so mounted the stabilizing bar serves to support vertical tongue weights of a trailer, the horizontal plane adjustment and serrated teeth arrangement permitting installation and rigidification of the structure. With this assembly installed to the auto, the hitch assembly so functions as to be substantially identical with a permanently installed hitch.

Manifestly minor changes in details of construction can be effected in the shown and described embodiment thereof without departing from the spirit and scope of the invention as defined in and limited solely by the appended claims.

I claim:

1. A hitch bar stabilizer for a hitch bar mounted on a towing vehicle bumper comprising:
   A. a clamping frame mounting said hitch bar on said bumper;
   B. a stabilizer bar including first and second arm portions longitudinally adjustably interconnected at mating ends thereof and the opposite ends thereof being respectively attached to said clamping frame and a frame portion of said vehicle angularly adjustable in vertical planes;
   C. said arms conjointly forming a depending generally U-shaped brace member rigidly interconnecting the vehicle frame and said clamping frame and preventing twisting of said bumper due to turning torque forces thereon by transferring the forces to the vehicle frame.

2. A hitch bar stabilizer for a hitch bar mounted on a towing vehicle bumper comprising:
   A. a clamping frame mounting said hitch bar on said bumper;
   B. a stabilizer bar including:
      i. a first arm; and
      ii. a second arm;
   C. said first arm being attached at one end to said clamping frame and angularly adjustable in a vertical plane;
   D. said second arm being attached at one end to a frame portion of the vehicle and angularly adjustable in a vertical plane; and
   E. the free ends of said arms having interengageable and coacting adjustment and securement means for varying the composite length of the arm.

3. A hitch bar stabilizer as claimed in claim 2, wherein the free ends of said arm portions have interengaging serrations on mating faces thereof and elongated slots therethrough and securing means extending through said slots.

4. A hitch bar stabilizer for a hitch bar assembly mounted on a towing vehicle bumper comprising:
   A) a stabilizer bar, including:
      i. a first arm, and
      ii. a second arm;
   B. one end of said first arm having a plurality of staggered holes and a hitch bar mounting opening;
   C. a clamping frame for said hitch bar mounting said hitch bar on said bumper;
   D. said clamping frame having a plurality of staggered holes adapted for mating coaction with said staggered holes in said first arm, said staggered holes coacting for angular adjustment of said first arm in a vertical plane with respect to said clamping frame to a substantially horizontal plane position;
   E. interconnecting securing means coactable with said mating coacting holes;
   F. said second arm being connected to a frame portion of the towing vehicle and angularly adjustable in a vertical plane; and
   G. means horizontally adjustably interconnecting the free ends of said first and second arms to permit longitudinal extended adjustment therebetween to accommodate to different towing vehicle constructions.

5. A hitch bar stabilizer as claimed in claim 4, the inner faces of the free ends of said first and second arms having serrations thereon and longitudinally extending slots therethrough, said serrations and said slots being coactable between said first and second arms to permit said longitudinal extended adjustment therebetween in conjunction with securement means between said arms.

* * * * *